United States Patent
Xu et al.

(10) Patent No.: US 11,993,703 B2
(45) Date of Patent: May 28, 2024

(54) AGEING-RESISTANT RUBBER COMPOSITION AND PROCESSING METHOD THEREFOR AND USE THEREOF

(71) Applicant: HANGZHOU XINGLU TECHNOLOGIES CO., LTD., Zhejiang (CN)

(72) Inventors: Tao Xu, Hangzhou (CN); Zhi Sheng Fu, Hangzhou (CN); An Yang Wu, Hangzhou (CN)

(73) Assignees: HANGZHOU XINGLU TECHNOLOGIES CO., LTD., Zhejiang (CN); ZHEJIANG UNIVERSITY, Zhejiang (CN)

( * ) Notice: Subject to any disclaimer, the term of this patent is extended or adjusted under 35 U.S.C. 154(b) by 702 days.

(21) Appl. No.: 17/259,926

(22) PCT Filed: Jun. 25, 2019

(86) PCT No.: PCT/CN2019/092645
§ 371 (c)(1),
(2) Date: Jan. 12, 2021

(87) PCT Pub. No.: WO2020/011006
PCT Pub. Date: Jan. 16, 2020

(65) Prior Publication Data
US 2021/0292532 A1   Sep. 23, 2021

(30) Foreign Application Priority Data
Jul. 13, 2018   (CN) .......................... 201810770530.2

(51) Int. Cl.
| | | |
|---|---|---|
| C08L 23/28 | (2006.01) |
| B60C 1/00 | (2006.01) |
| B65G 15/32 | (2006.01) |
| C08K 3/06 | (2006.01) |
| C08K 3/22 | (2006.01) |
| C08K 5/00 | (2006.01) |
| C08K 5/14 | (2006.01) |
| C08K 5/405 | (2006.01) |
| C08L 23/06 | (2006.01) |
| C08L 23/16 | (2006.01) |
| C08L 23/22 | (2006.01) |
| C08L 23/34 | (2006.01) |

(52) U.S. Cl.
CPC .......... *C08L 23/286* (2013.01); *B60C 1/0008* (2013.01); *B65G 15/32* (2013.01); *C08K 3/06* (2013.01); *C08K 3/22* (2013.01); *C08K 5/0025* (2013.01); *C08K 5/14* (2013.01); *C08K 5/405* (2013.01); *C08L 23/06* (2013.01); *C08L 23/16* (2013.01); *C08L 23/22* (2013.01); *C08L 23/34* (2013.01); *C08K 2003/2217* (2013.01); *C08K 2003/2296* (2013.01); *C08L 2201/02* (2013.01); *C08L 2205/025* (2013.01); *C08L 2205/035* (2013.01); *C08L 2207/07* (2013.01)

(58) Field of Classification Search
CPC ........ C08L 15/02; C08L 23/06; C08L 23/286; C08L 23/32; C08L 23/34; C08L 2207/07
USPC .................................................. 525/232, 240
See application file for complete search history.

(56) References Cited

U.S. PATENT DOCUMENTS

| | | | | |
|---|---|---|---|---|
| 6,765,063 B2 * | 7/2004 | Sandstrom | ............ | B60C 1/0008 |
| | | | | 525/213 |
| 8,076,416 B2 * | 12/2011 | Ellul | ...................... | C08L 23/16 |
| | | | | 525/240 |

FOREIGN PATENT DOCUMENTS

| | | |
|---|---|---|
| CN | 1114934 A | 1/1996 |
| CN | 102558582 A | 7/2012 |
| CN | 104877225 A | 9/2015 |
| CN | 106220934 A | 12/2016 |
| DE | 214623 A1 | 10/1984 |

OTHER PUBLICATIONS

SIPO, International Search Report issued in IA No. PCT/CN2019/092645, dated Sep. 26, 2019.

* cited by examiner

Primary Examiner — Fred M Teskin
(74) Attorney, Agent, or Firm — LKGlobal | Lorenz & Kopf, LLP

(57) ABSTRACT

Disclosed are an aging-resistant rubber composition and methods for processing and use thereof. The rubber composition includes a rubber matrix and compounding components. In parts by weight, every 100 parts of rubber matrix comprise 50-99 parts of a halogenated butyl rubber, 0-50 parts of a highly branched polyethylene P1, and 0-50 parts of P2 obtained by the polarization modification of said highly branched polyethylene P1. The sum of P1 and P2 in parts by weight is 1-50 parts; and the compounding components comprise a vulcanization system.

14 Claims, No Drawings

AGEING-RESISTANT RUBBER COMPOSITION AND PROCESSING METHOD THEREFOR AND USE THEREOF

CROSS REFERENCE TO RELATED APPLICATIONS

The present application is the U.S. national phase of and claims priority to International Patent Application No. PCT/CN2019/092645 filed Jun. 25, 2019, which claims the benefit of priority from China National Application No. 201810770530.2, filed on Jul. 13, 2018, the entire content of which is incorporated herein by reference into the present disclosure as if fully set forth herein.

TECHNICAL FIELD

The present invention relates to the technical field of rubber, and particularly relates to a heat aging-resistant rubber composition and a processing method therefor and use thereof.

RELATED ART

Butyl rubber is obtained by copolymerizing isobutylene with a small amount of isoprene, which has a series of excellent properties, such as good air tightness, good weather resistance, good shock absorption, and chemical corrosion resistance. Halogenated butyl rubber is obtained by the modification of the butyl rubber via halogenation. Because of having more vulcanization ways and a better comprehensive performance than the butyl rubber, the halogenated butyl rubber is the mainstream product of butyl rubber in the current market, which is widely used in various applications, such as tire inner-liners, rubber hoses, conveyor belts, medical products, and shock absorption products, but it also has certain limitations. Due to the presence of a small amount of double bond structures in the molecular structure of the halogenated butyl rubber, its heat aging resistance is usually inferior to that of the rubbers with a fully saturated backbone, such as ethylene propylene rubber or ethylene propylene diene monomer rubber, which limits its applications to some extent. In the prior art, the butyl rubbers are usually used in combination with ethylene propylene rubbers to improve its heat aging resistance. However, because the copolymerizing materials contain a third monomer with a bifunctional group, the resultant ethylene propylene diene monomer rubber has a weaker heat aging resistance than that of the ethylene propylene rubber. Nevertheless, the ethylene propylene rubber has weaker physical properties than that of the ethylene propylene diene monomer rubber, and if it is used in combination with the halogenated butyl rubber, the comprehensive performance of products may be significantly affected. Therefore, there is still room for optimization on the technical issue of how to improve the heat aging resistance of the halogenated butyl rubber.

SUMMARY

In view of the problems existing in the prior art, the present invention provides a heat aging-resistant rubber composition and a processing method therefor and use thereof. A technical solution of the present invention is to use a halogenated butyl rubber in combination with a highly branched polyethylene that has a fully saturated molecular structure and good physical and mechanical properties to improve the heat aging resistance. In a further technical solution, a part or all of the highly branched polyethylene is replaced with a polarization modified highly branched polyethylene for reducing the impact of the adhesiveness of the halogenated butyl rubber, making it more suitable for the applications with adhesion requirements.

A technical solution of the present invention is to provide a rubber composition comprising a rubber matrix and compounding components, wherein in parts by weight, every 100 parts of the rubber matrix include 50-99 parts of a halogenated butyl rubber, 0-50 parts of a highly branched polyethylene P1, and 0-50 parts of P2 obtained by the polarization modification of the highly branched polyethylene P1, and the sum of P1 and P2 in parts by weight is 1-50 parts; wherein the P1 is an ethylene homopolymer having a branching degree of not less than 50 branches/1000 carbon atoms; and the compounding components include a vulcanization system.

In a further technical solution, 100 parts of the rubber matrix include 50-95 parts of a halogenated butyl rubber, 0-50 parts of a highly branched polyethylene P1, and 0-50 parts of P2 obtained by the polarization modification of the highly branched polyethylene P1, and the sum of P1 and P2 in parts by weight is 5-50 parts.

In a further technical solution, 100 parts of the rubber matrix include 50-90 parts of a halogenated butyl rubber, 0-50 parts of a highly branched polyethylene P1, and 0-50 parts of P2 obtained by the polarization modification of the highly branched polyethylene P1, and the sum of P1 and P2 in parts by weight is 10-50 parts.

The highly branched polyethylene P1 used in the present invention is a kind of ethylene homopolymer having a branching degree of not less than 50 branches/1000 carbon atoms, which may also be referred to as Branched Polyethylene or Branched PE. Currently, Branched PE is mainly synthesized by homopolymerizing ethylene following a "chain walking mechanism" in the presence of a late transition metal catalyst, where the late transition metal catalyst is preferably an (α-diimine) nickel/palladium catalyst. The nature of the chain walking mechanism refers to the fact that a β-hydrogen elimination reaction and a re-insertion reaction tend to occur in the polymerization of an olefin in the presence of a late transition metal catalyst, for example, an (α-diimine) nickel/palladium catalyst, thereby causing branching. The branches pendant to the backbone of such highly branched polyethylene may have different numbers of carbon atoms, and specifically 1 to 6 or more carbon atoms.

An (α-diimine) nickel catalyst has significantly lower production cost than an (α-diimine) palladium catalyst, and is more suitable for industrial applications. Therefore, in the present invention, an (α-diimine) nickel catalyst is preferably used in the production of a highly branched polyethylene through catalytic polymerization of ethylene.

The highly branched polyethylene used in the present invention has a branching degree of not less than 50 branches/1000 carbon atoms, and a weight average molecular weight of not less than 66,000. The branching degree is further preferably 60-130 branches/1000 carbon atoms, and the weight average molecular weight is further preferably 66,000-518,000. The branching degree is further preferably 70-120 branches/1000 carbon atoms, and the weight average molecular weight is further preferably 82,000-436,000. The branching degree is further preferably 72-112 branches/1000 carbon atoms, and the weight average molecular weight is further preferably 158,000-356,000. The branching degree is further preferably 82-105 branches/1000 carbon atoms, and the weight average molecular weight is further preferably 268,000-356,000. The Mooney viscosity ML (1+4) at 125° C. is preferably 6-102, further preferably 12-93, further preferably 20-80, and further preferably 42-80.

The halogenated butyl rubber used in the present invention may be selected from a halogenated isobutylene/isoprene copolymer or a halogenated isobutylene/p-methylstyrene copolymer, preferably a halogenated isobutylene/isoprene copolymer, and specifically chlorinated butyl rubber or brominated butyl rubber.

The highly branched polyethylene is a completely non-polar polymer, and may affect the overall adhesiveness and other properties related to polarity when used in combination with the halogenated butyl rubber. Therefore, a further technical solution of the present invention is to partially or fully use a polarization modified highly branched polyethylene in combination with the halogenated butyl rubber to reduce the impact on the overall polarity.

In the present invention, a polar monomer used for preparing P2 may be selected from maleic anhydride (MAH), methacrylic acid (MA), acrylic acid (AA), itaconic acid (IA), fumaric acid (FA), isocyanate, glycidyl methacrylate (GMA), methyl methacrylate (MMA), dibutyl fumarate (DBF), β-hydroxyethyl methacrylate (HEMA), dibutyl maleate (DBM), diethyl maleate (DEM), halogen element (such as liquid chlorine and liquid bromine), a halogen-containing compound (such as N-bromosuccinimide, 1,3-dibromo-5,5-dimethylhydantoin, activated carbon-adsorbed chlorine, and activated carbon-adsorbed bromine), a sulfur-containing compound (such as sulfur dioxide and sulfinyl chloride), vinyltrimethoxysilane (VTMS), vinyltriethoxysilane (VTES), 3-methacryloxypropyltrimethoxysilane (VMMS), styrene (St), α-methylstyrene (α-MSt), and acrylonitrile (AN). In a preferred technical solution, the polar monomer that can be used includes at least one of the foregoing polar monomers.

P2 used in the present invention may be prepared by grafting the polar monomer onto the highly branched polyethylene using a variety of methods, such as solution grafting, swelling grafting, thermal grafting, melt grafting, radiation grafting, emulsion grafting, and suspension grafting, in the presence of one or more actions of a free radical initiator, high temperature, high shear stress, high energy radiation, ultrasonic wave, and the like. More specifically, it is prepared by using solution grafting or melt grafting under the action of a free radical initiator. The solvent used in the solution grafting includes toluene, xylene, benzene, n-hexane, cyclohexane, n-heptane, carbon tetrachloride, chlorobenzene, trichlorobenzene, or a mixed solvent of the foregoing solvents. The polar monomer that can be used may be one or two or more monomers. To improve grafting efficiency or inhibit the side reactions such as degradation or cross-linking occurred during the grafting reaction, two or more multi-monomer grafting technologies may be used for modification. For example, by using styrene as a co-monomer, grafting efficiency may be improved and the side reactions such as degradation or cross-linking occurred during the grafting reaction may be inhibited, thereby improving the grafting effect.

In the present invention, P2 may be selected from highly branched polyethylene grafted maleic anhydride, highly branched polyethylene grafted acrylonitrile, highly branched polyethylene grafted styrene, a halogen-containing highly branched polyethylene, and the like. From a cost perspective, P2 is preferably a halogen-containing branched polyethylene, with a polar group comprising at least one of chloro, bromo, chlorosulfonyl, and bromosulfonyl. The halogen-containing branched polyethylene is preferably at least one of chlorinated branched polyethylene, brominated branched polyethylene, and chlorosulfonated branched polyethylene, wherein the halogen content is preferably 0.2-50%. The method for preparing P2 is preferably the solution grafting. More specifically, the method comprises dissolving P1 in a solvent and then reacting with a polar monomer in the presence of a free radical initiator to obtain chlorinated branched polyethylene, brominated branched polyethylene, or chlorosulfonated branched polyethylene, wherein the chlorine content is preferably 0.5-45.5%, further preferably 1.2-35.6%, and the bromine content is preferably 0.8-4%, further preferably 1-3.2%.

Since the number of halogen atoms of halogenated butyl rubber needs to be controlled below the number of double bonds, which otherwise may cause the C—C bond to break, the halogen content is limited, thereby limiting the adhesiveness and other properties related to polarity. When the halogenated butyl rubber is used in the applications that require the adhesion, it is often necessary to use other auxiliary means to meet the needs of the adhesion strength. In contrast, the halogenation modification of the highly branched polyethylene does not have the limitations of the halogenation modification of the butyl rubber, and may be adjusted within a wide range of the halogen content. Therefore, the rubber composition of the present invention may further improve the adhesiveness of the halogenated butyl rubber to a certain extent.

The highly branched polyethylene P1 may be further reacted with the polar monomers such as maleic anhydride, acrylonitrile, and styrene after chlorination or bromination to obtain a more targeted modified highly branched polyethylene.

In a further technical solution of the present invention, based on 100 parts by weight of the rubber matrix, the rubber matrix further includes 0-30 parts of ethylene propylene diene monomer rubber, the third monomer of which may be specifically selected from 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylene-2-norbornene, 1,5-cyclooctadiene, 1,4-cyclooctadiene, and the like, and preferably at least one of 5-ethylidene-2-norbornene, 5-vinyl-2-norbornene, dicyclopentadiene, and 1,4-hexadiene. The ethylene propylene diene monomer rubber may generally be vulcanized with sulfur and/or peroxide, which can improve the overall co-vulcanization of the rubber composition.

In a further technical solution, based on 100 parts by weight of the rubber matrix, the rubber matrix further includes 0-30 parts of chlorinated polyethylene or chlorosulfonated polyethylene to replace P2 for reducing costs.

In a further technical solution, the vulcanization system of the rubber composition in the present invention may be selected from a peroxide vulcanization system, a sulfur vulcanization system, a thiourea vulcanization system, a thiadiazole vulcanization system, a triazole dimercaptoamine salt vulcanization system, a metal oxide vulcanization system, a phenol formaldehyde resin vulcanization system, an N,N'-m-phenylene bismaleimide vulcanization system, a radiation vulcanization sensitization system, and the like, and preferably selected from at least one of a peroxide vulcanization system, a sulfur vulcanization system, a thiourea vulcanization system, a metal oxide vulcanization system, and a radiation vulcanization sensitization system.

The peroxide vulcanization system includes a peroxide crosslinking agent and an auxiliary crosslinking agent. In a further technical solution, based on 100 parts by weight of the rubber matrix, the peroxide crosslinking agent is used in an amount of 1-10 parts, and the auxiliary crosslinking agent is used in an amount of 0.2-20 parts. The peroxide crosslinking agent includes at least one of di-tert-butyl peroxide, dicumyl peroxide, tert-butyl cumyl peroxide, 1,1-di(tert-butylperoxy)-3,3,5-trimethylcyclohexane, 2,5-dimethyl-2,5-di(tert-butylperoxy)hexane, 2,5-dimethyl-2,5-di(tert-butylperoxy)-3-hexyne, bis(tert-butylperoxyisopropyl)benzene (BIBP), 2,5-dimethyl-2,5-bis(benzoylperoxy)hexane (DBPMH), tert-butyl peroxybenzoate, and tert-butylperoxy-2-ethylhexyl carbonate. The auxiliary crosslinking agent includes at least one of triallyl cyanurate, triallyl isocyanurate, ethylene glycol dimethacrylate, ethyl dimethylacrylate, triethylene glycol dimethacrylate, triallyl trimellitate, trimethylolpropane trimethacrylate, ethylene dimethacrylate, N,N'-m-phenylene bismaleimide (HVA-2), N,N'-bis(furfurylidene) acetone, 1,2-polybutadiene, p-quinone dioxime, sulfur, and metal salts of unsaturated carboxylic acids. The metal salts of unsaturated carboxylic acids include at least one of zinc acrylate, zinc methacrylate (ZDMA), magnesium methacrylate, calcium methacrylate, and aluminum methacrylate.

The physical and mechanical properties of vulcanized rubber, especially the tensile strength, may be improved by adding an appropriate amount of the metal salts of unsaturated carboxylic acids such as zinc methacrylate. HVA-2 may be used as the auxiliary crosslinking agent, which may accelerate the vulcanization speed, increase the crosslinking density and improve the crosslinking network; and may further be used as a vulcanizing agent of the halogenated butyl rubber, which is conducive to improving co-vulcanization of P1 or P2 with the halogenated butyl rubber, thereby improving overall comprehensive performance of the rubber compound.

The sulfur vulcanization system includes sulfur and an accelerator. In a further technical solution, based on 100 parts by weight of the rubber matrix, the sulfur is used in an amount of 0.3-2 parts, and the accelerator is used in an amount of 0.5-3 parts. The accelerator may be selected from at least one of 2-mercaptobenzothiazole, dibenzothiazyl disulfide, tetramethylthiurammonosulfide, tetramethylthiuram disulfide, tetraethylthiuram disulfide, N-cyclohexyl-2-benzothiazole sulfenamide, N,N-dicyclohexyl-2-benzothiazole sulfenamide, bismaleimide, and 1,2-ethylene thiourea.

Based on 100 parts by weight of the rubber matrix, the sulfur vulcanization system may further include 3-6 parts of zinc oxide and 0-1 parts of magnesium oxide.

When the peroxide vulcanization system is used in combination with the sulfur vulcanization system, the rubber matrix may further include a certain amount of ethylene propylene diene monomer rubber to improve the overall co-vulcanization of the rubber composition. Specifically, 100 parts of the rubber matrix include 0-30 parts of ethylene propylene diene monomer rubber.

The thiourea vulcanization system includes thiourea and sulfur. The thiourea may be selected from ethyl thiourea or ethylene thiourea. The thiourea vulcanization system can not only used for the halogenated butyl rubber, but also may vulcanize a halogenated branched polyethylene with a high halogen content in a similar manner to that of conventional chlorinated polyethylene (CPE). When the rubber composition of the present invention includes both the branched polyethylene with a high halogen content and the halogenated butyl rubber, the vulcanization system may include an amount of a thiourea component, to facilitate the improvement of the co-vulcanization and mechanical strength.

The thiadiazole vulcanization system and the triazole dimercaptoamine salt vulcanization system are suitable for vulcanizing the rubber composition having the rubber matrix with a high halogen content. The thiadiazole vulcanization system is composed of a crosslinking agent and an accelerator. The crosslinking agent is mainly a thiadiazole derivative crosslinking agent, such as ECHO.A, ECHO, TDD, PT75, TDDS, etc., and the common accelerator includes Vanax 808, EataAccelDH, NC, Accel903, BF, etc. In addition, a certain amount of an acid absorbent such as highly active magnesium oxide or ultrafine magnesium hydroxide is added. The triazole dimercaptoamine salt vulcanization system is a single substance that incorporates the effective groups of a thiadiazole vulcanizing agent and an accelerator (the condensate of n-butyraldehyde and aniline), which overcomes the shortcomings of the irregular distribution of bonds in the crosslinked rubber caused by the thiadiazole and accelerator, so that the rubber cross-linked body becomes a stable structure. Compared with the thiadiazole system, the salt also changes the PH of the system from strong acidity to neutral due to the introduction of special groups, which eliminates the adverse effect of acidic fillers on the system, so that the rubber is more chemically active during crosslinking. Therefore, the rubber cross-linked by the system has a substantial improvement in physical or chemical properties. The triazole dimercaptoamine salt vulcanization system is suitable for low-temperature, no-pressure and low-pressure vulcanization process conditions, has a fast vulcanization speed, a small addition amount, no decomposition at a vulcanization temperature, and no odor, and is environmentally friendly and non-toxic. The representative products are the vulcanizing agent FSH and the crosslinking agent TEHC.

The metal oxide vulcanization system includes zinc oxide and may further include magnesium oxide and stearic acid. Magnesium oxide functions as an anti-scorching agent, and stearic acid can assist in dispersing the metal oxide and adjusting the vulcanization rate.

The main component of the radiation vulcanization sensitization system is a radiation sensitizer, which may be selected from triallyl cyanurate, triallyl isocyanurate, ethylene glycol dimethacrylate, triethylene glycol dimethacrylate, trimethylolpropane trimethacrylate, and the like. The radiation vulcanization sensitization system is particularly suitable for the wire and cable applications that require electrical insulation properties or medical rubber products that require high material cleanliness.

In a further technical solution, in the rubber composition of the present invention, based on 100 parts by weight of the rubber matrix, the compounding components further include 10-200 parts of a reinforcing filler, 0-80 parts of a plasticizer, 3-30 parts of a metal oxide, 0-3 parts of stearic acid, 0-15 parts of a surface modifier, 0-6 parts of a stabilizer, 0-15 parts of a tackifier, 0-20 parts of an adhesive, 0-150 parts of a flame-retardant agent, and 0-20 parts of a foaming agent.

In a further technical solution, the reinforcing filler includes at least one of carbon black, white carbon black, calcium carbonate, calcined clay, talcum powder, magnesium silicate, aluminum silicate, magnesium carbonate, titanium dioxide, montmorillonite, staple fiber, kaolinite, and bentonite.

In a further technical solution, the plasticizer includes at least one of pine tar, motor oil, naphthenic oil, paraffin oil, aromatic oil, liquid 1,2-polybutadiene, liquid polyisobutene, ethylene dimethacrylate, liquid ethylene-propylene rubber, coumarone, RX-80, stearic acid, paraffin, chlorinated paraffin, dioctyl adipate, dioctyl sebacate, epoxidized soybean oil, dibutyl phthalate, dioctyl phthalate, diisodecyl phthalate, di(tridecyl) phthalate, and trioctyltrimellitate. To increase the adhesion, preferably, a plasticizer with a tackifying effect, such as pine tar, coumarone, RX-80, liquid polyisobutylene, and ethylene dimethacrylate, may further be used. To improve cold resistance, preferably, dioctyl adipate, dioctyl sebacate, and dibutyl phthalate may be used. For the halogen-containing rubber matrix, the epoxidized soybean oil can be used to stabilize the rubber matrix during processing.

In a further technical solution, the metal oxide includes at least one of zinc oxide, magnesium oxide, aluminum oxide, lead oxide, and calcium oxide. The metal oxide may assist cross-linking and absorb hydrogen chloride or hydrogen bromide.

In a further technical solution, the stabilizer is selected from 2,2,4-trimethyl-1,2-dihydroquinoline polymer (RD), 6-ethoxy-2,2,4-trimethyl-1,2-dihydroquinoline (AW), 2-mercaptobenzimidazole (MB), N-phenyl-N'-cyclohexyl-p-phenylenediamine (4010), N-isopropyl-N'-phenyl-p-phenylenediamine (40110NA), N-(1,3-dimethyl)butyl-N'-phenyl-p-phenylenediamine (4020), and the like. For the rubber composition including the rubber matrix with a high halogen content, the stabilizer may further be selected from basic lead salt compounds, metallic soap compounds, organic tin compounds, epoxy compounds, phosphite ester compounds, polyol compounds, and the like. The basic lead salt compounds are selected from lead stearate, dibasic lead phthalate, basic lead silicate, lead phthalate, and the like.

In a further technical solution, the flame-retardant agent includes at least one of pentaerythritol, ammonium polyphosphate, triethyl phosphate, aluminum hydroxide, magnesium hydroxide, zinc borate, antimonous oxide, zinc stearate, titanate, decabromodiphenyl oxide, silane coupling agent-modified hydroxide, and red phosphorus. The aluminum hydroxide, the magnesium hydroxide, and the silane coupling agent-modified hydroxide are respectively nano aluminum oxide, nano magnesium hydroxide, and silane coupling agent-modified nano hydroxide, and the red phosphorus is a microencapsulated red phosphorus.

In a further technical solution, the surface modifier includes at least one of polyethylene glycol, diphenyl silandiol, triethanolamine, silane coupling agent, and a titanate coupling agent.

In a further technical solution, the adhesive includes at least one of a resorcinol donor, a methylene donor, organic cobalt salt, maleic anhydride-butadiene resin, and liquid natural rubber. The resorcinol donor may be selected from at least one of resorcinol (Adhesive R), Adhesive RS, Adhesive RS-11, Adhesive R-80, Adhesive RL, Adhesive PF, Adhesive PE, Adhesive RK, and Adhesive RH; and the methylene donor can be selected from at least one of hexamethylenetetramine (HMTA), Adhesive H-80, Adhesive A, Adhesive RA, Adhesive AB-30, Adhesive Rq, Adhesive RC, Adhesive CS963, and Adhesive CS964. The organic cobalt salt, such as cobalt boronacylate, may effectively improve the adhesive strength between the rubber composition and the metal. In a further technical solution, the adhesive may also be a type of a triazine adhesive selected from at least one of Adhesive TAR, Adhesive TZ, Adhesive AIR-1, and Adhesive AIR-101, and preferably selected from at least one of Adhesive AIR-1 and Adhesive AIR-101, which can partially replace the resorcinol donor adhesive, and has the advantages of good adhesion and relatively environmental friendliness. The adhesion system in combination with white carbon black may have good adhesion.

In an embodiment of the present invention, in order to improve the adhesion of the rubber compound, the rubber composition can further include a tackifier. The pine tar, coumarone resin, RX-80, and liquid polyisobutylene as exemplified for the plasticizer also have a tackifying effect, wherein liquid coumarone resin has a better tackifying effect than that of solid coumarone resin. The tackifier can also be selected from a C5 petroleum resin, a C9 petroleum resin, Escorez1102 resin, hydrogenated rosin, terpene resin, an alkyl phenol formaldehyde resin, a modified alkyl phenol formaldehyde resin, an alkylphenol-acetylene resin, an unsaturated carboxylic acid metal salt, and the like. Based on 100 parts by weight of the rubber matrix, the tackifier is usually used in an amount of not more than 30 parts by weight. The unsaturated carboxylic acid metal salt, such as methacrylate salt, can not only improve the adhesiveness, but also functions as a stabilizer, thereby improving the high-temperature aging resistance of the rubber composition.

In a further technical solution, the foaming agent includes at least one of sodium bicarbonate, azodicarbonamide (AC), dinitrosopentylenetetramine (H), 4,4'-oxydibenzenesulfonyl hydrazide (OBSH), benzenesulfonyl hydrazide (BSH), urea, and a microencapsulated foaming agent containing a low-boiling point hydrocarbon.

The rubber composition of the present invention may be present in the form of an uncrosslinked rubber mix, and may be present in the form of a vulcanized rubber after a further crosslinking reaction. The vulcanized rubber may also be simply referred to as a vulcanizate.

The present invention further provides a method A for processing the foregoing rubber composition, comprising a mixing process that includes the following steps:

(1) setting the temperature and rotor speed of an internal mixer;
(2) adding a rubber matrix to the internal mixer for mixing;
(3) sequentially adding the components other than the vulcanization system in compounding components to the internal mixer in the order of dry agents and liquid agents for mixing until the power is stable;
(4) adding the components of the vulcanization system to the internal mixer for mixing when the temperature of the internal mixer is appropriate, and then discharging the rubber;
or directly discharging the rubber after the step (3), and adding the vulcanization system to an open mill with an appropriate temperature; and
(5) plasticating the rubber on the open mill or a multi-roller calendar to a sheet, unloading, cooling, and standing for 16-24 hours, and then remixing and discharging the sheet.

When the Mooney viscosities of different components in the rubber matrix are significantly different, the present invention further provides another method B for processing the foregoing rubber composition. Specifically, the method comprises to dividing the components of the rubber matrix into at least two groups by using a masterbatch method, each group being made into a masterbatch with an equivalent Mooney viscosity according to steps 1 to 3 in the method A; adding each masterbatch to an internal mixer or an open mill for mixing; and then adding the vulcanization system, evenly mixing, and then plasticating and unloading.

When the rubber composition includes two or more vulcanization systems, and the co-vulcanization of the rubber matrix is poor, the present invention further provides another method C for processing the foregoing rubber composition. Specifically, the method comprises to dividing the components of the rubber matrixes into at least two groups by using a masterbatch method, each group being made into a masterbatch according to steps 1 to 4 in method A; adding each masterbatch to an internal mixer or an open mill for mixing; and then plasticating and unloading after mixing evenly.

The present invention further provides a conveyor belt comprising a covering rubber layer for working surface and a covering rubber layer for non-working surface, at least one of which includes the foregoing rubber composition. Using the rubber composition of the present invention as the covering rubber of the conveyor belt may have a good heat resistance and wear resistance. When the rubber matrix includes P2 with a high degree of polarization (i.e., degree of halogenation), it is also expected to improve the adhesion between the covering rubber of the conveyor belt and the adhesive layer, and moderately improve one or more of properties such as anti-staticity, flame retardancy, and oil resistance.

The present invention further provides an inner tube, wherein the rubber used in the inner tube includes the foregoing rubber composition, which may optimize the processing performance to a certain extent, and overcome the problems of large shrinkage and hysteresis heat generation of the rubber compound. When the rubber composition is used in combination with highly-polarized P2, the processing effect of the valve attachment procedure may further be improved.

The present invention further provides a tire comprising an inner-liner, wherein the rubber used in the inner-liner includes the foregoing rubber composition. When the vehicle is running at high speed, the internal temperature of the tire carcass is prone to rise above 100° C., which requires the rubber materials inside the carcass to have a high heat resistance. The rubber composition of the present invention has a good heat aging resistance and can be used in high temperature environments. Moreover, when an appropriate amount of the highly-polarized P2 is added, the adhesive strength between the inner-liner and the carcass may be improved.

Properly increasing the halogen content may further improve the gas barrier capability of the highly branched polyethylene, so that the rubber composition of the present invention is more suitable for the inner tube or the inner-liner.

When the rubber composition of the present invention is used in the applications such as the inner tube or the inner-liner that have relatively high requirements for gas barrier capability, the compounding components may further include 0-40 parts of an air-blocking agent, such as NM360 and EVOH, based on 100 parts by weight of the rubber matrix.

Additionally, because the highly branched polyethylene is superior to the halogenated butyl rubber in terms of mechanical strength, compression set resistance, electrical insulation, etc., the rubber composition of the present invention may further be used in the applications such as rubber hoses, wires and cables, medical rubber plugs, and shock absorption products.

The present invention has the following beneficial effects: 1. The heat aging resistance of the halogenated butyl rubber can be improved, making it more suitable for high temperature environments. 2. By adjusting the degree of halogenation of the added highly branched polyethylene, the properties of the halogenated butyl rubber related to the halogen content, such as the adhesiveness, oil resistance, and flame retardancy, may further be improved, thereby overcoming the limitation of the halogen content of the halogenated butyl rubber.

DETAILED DESCRIPTION

The following examples are given to further illustrate the present invention, and not intended to limit the scope of the present invention. Some non-essential improvements and modifications made by the skilled person in the art based on the disclosure herein are still within the scope of the present invention.

The branched polyethylene raw materials used in examples are characterized by preferably having a branching degree of 50-130 branches/1000 carbon atoms, a weight average molecular weight of $6.6 \times 10^4$-$53.4 \times 10^4$ g/mol, and a Mooney viscosity ML (1+4) at 125° C. of 6-105. The branching degree is measured by $^1$H NMR, and the molar percentages of various branches are measured by $^{13}$C NMR.

The branched polyethylene raw materials are further preferably selected from the following table:

| Branched polyethylene No. | Branching degree | Methyl content/% | Ethyl content/% | Propyl content/% | Butyl content/% | Pentyl content/% | Hexyl and longer branch content/% | Weight average molecular weight/ ×10,000 | Molecular weight distribution | Mooney viscosity ML (1 + 4) 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 120 | 49.2 | 17.9 | 8.2 | 6.1 | 5.1 | 13.5 | 8.2 | 2.1 | 12 |
| PER-3 | 112 | 52.4 | 16.2 | 7.6 | 5.6 | 4.9 | 13.3 | 22.5 | 1.9 | 32 |
| PER-4 | 105 | 54.0 | 13.7 | 6.4 | 5.3 | 5.1 | 15.5 | 26.8 | 2.1 | 42 |
| PER-5 | 102 | 56.2 | 12.9 | 6.2 | 5.2 | 4.9 | 14.6 | 27.9 | 2.1 | 52 |
| PER-6 | 99 | 59.6 | 11.6 | 5.8 | 4.9 | 5.1 | 13.0 | 28.3 | 1.8 | 63 |
| PER-7 | 97 | 60.5 | 10.8 | 5.7 | 4.7 | 4.9 | 13.3 | 34.8 | 2.0 | 65 |
| PER-8 | 90 | 62.1 | 9.4 | 5.4 | 4.6 | 4.5 | 14.0 | 32.1 | 2.1 | 77 |
| PER-9 | 82 | 64.2 | 8.7 | 5.3 | 4.2 | 3.9 | 13.7 | 35.6 | 1.7 | 80 |
| PER-10 | 72 | 67.1 | 6.2 | 3.7 | 4.1 | 3.3 | 15.6 | 15.8 | 1.9 | 20 |
| PER-11 | 70 | 66.5 | 7.2 | 4.6 | 3.2 | 3.2 | 15.3 | 43.6 | 2.1 | 93 |
| PER-12 | 60 | 68.1 | 7.1 | 4.2 | 2.7 | 2.8 | 15.1 | 51.8 | 2.2 | 102 |
| PER-13 | 50 | 69.2 | 7.1 | 3.9 | 2.5 | 2.6 | 14.7 | 53.4 | 2.3 | 105 |

The preparation method for the halogen-containing branched polyethylene used in the examples of the present invention was prepared by introducing chlorine gas, bromine, or sulfur dioxide into a carbon tetrachloride or hexane solution containing a branched polyethylene and a free radical initiator (such as azobisisobutyronitrile), and controlling different reaction temperatures and times, to obtain different halogen-containing branched polyethylenes. The halogen-containing branched polyethylene used in the examples of the present invention is selected from the following table:

| P2 No. | Branched polyethylene raw materials No. | Mass percentage of Chlorine/% | Mass percentage of Bromine/% | Mass percentage of Sulfur/% |
|---|---|---|---|---|
| P2-1 | PER-5 | 0.5 | | |
| P2-2 | PER-5 | 1.2 | | |
| P2-3 | PER-5 | 1.9 | | |
| P2-4 | PER-5 | 3.1 | | |
| P2-5 | PER-5 | 6.3 | | |
| P2-6 | PER-5 | 10.4 | | |
| P2-7 | PER-8 | | 1 | |
| P2-8 | PER-5 | | 1.5 | |
| P2-9 | PER-4 | | 1.9 | |
| P2-10 | PER-7 | | 2.1 | |
| P2-11 | PER-8 | | 3.2 | |
| P2-12 | PER-10 | 6.2 | | |
| P2-13 | PER-5 | 15.3 | | |
| P2-14 | PER-4 | 23.8 | | |
| P2-15 | PER-4 | 35.6 | | |
| P2-16 | PER-4 | 45.5 | | |
| P2-17 | PER-3 | 36.1 | | 1 |

The halogenated butyl rubber used in the examples of the present invention may be selected from the following table:

| Halogenated butyl rubber No. | Mass percentage of Chlorine/% | Mass percentage of Bromine/% | Mooney viscosity ML (1 + 8) 125° C. |
|---|---|---|---|
| CIIR-1 | 1.2 | | 38 |
| CIIR-2 | 1.2 | | 50 |
| BIIR-1 | | 2 | 32 |
| BIIR-2 | | 2 | 46 |

Rubber Performance Test Methods:
1. Hardness test: The test is carried out by using a hardness tester at room temperature in accordance with the national standard GB/T531.1-2008.
2. Tensile strength and elongation at break performance test: The test is carried out with a type 2 dumbbell sample by using an electronic tensile tester at a tensile speed of 500 mm/min and a test temperature of 23±2° C. in accordance with the national standard GB/T528-2009.
3. Mooney viscosity test: The test is carried out with a Mooney viscosity meter in accordance with the national standard GB/T1232.1-2000, at a test temperature set according to the actual conditions, by preheating for 1 minute, and the test is continued for 4-8 minutes.
4. Hot air accelerated aging test: The test is carried out in a heat aging test chamber in accordance with the national standard GBAT3512-2001, at a temperature and for the time set according to the actual conditions.
5. Air tightness test: The gas barrier test is carried out by using an air tightness tester in accordance with the national standard GB7755.

Examples 1-6 and Comparative Example 1

The present invention provides a rubber composition with a good heat resistance and wear resistance, which is suitable for the applications such as a heat-resistant conveyor belt that have requirements for the heat resistance and wear resistance. Examples 1-6 and Comparative Example 1 are used as examples. The basic compositions of Examples 1-6 and Comparative Example 1 are shown in Table 1:

TABLE 1

| Component | Comparative Example | Example 1 | Example 2 | Example 3 | Example 4 | Example 5 | Example 6 |
|---|---|---|---|---|---|---|---|
| Halogenated butyl rubber No. | BIIR-2 | BIIR-2 | BIIR-2 | BIIR-2 | BIIR-2 | CIIR-2 | CIIR-2 |
| Amount of Halogenated butyl rubber | 100 | 90 | 80 | 70 | 75 | 60 | 50 |
| P1 No. | | PER-3 | PER-4 | PER-5 | | PER-10 | |
| Amount of P1 | | 10 | 20 | 30 | | 20 | |
| P2 No. | | | | | P2-10 | P2-12 | P2-13 |
| Amount of P2 | | | | | 25 | 20 | 50 |
| Zinc oxide | 5 | 5 | 5 | 5 | 5 | 5 | 5 |
| Magnesium oxide | 1 | 1 | 1 | 1 | 1 | 1 | 1 |
| Stearic acid | 1 | 1 | 1 | 1 | 1 | 1 | 1 |
| Anti-aging agent RD | 1 | 1 | 1 | 1 | 1 | 1 | 1 |
| Polyethylene glycol PEG4000 | 2 | 2 | 2 | 2 | 2 | 2 | 2 |
| Carbon black N330 | 50 | 50 | 50 | 50 | 50 | 50 | 50 |
| Paraffin oil Sunpar2280 | 10 | 10 | 10 | 10 | 10 | 10 | 10 |
| DCP | 1 | 1.2 | 1.4 | 1.6 | 1.5 | 2 | 2 |
| HVA-2 | 2 | 2 | 2 | 2 | 2 | 1.5 | 1.5 |
| TAIC | | 0.3 | 0.5 | 0.5 | 0.5 | 0.6 | 0.6 |
| Sulfur | | | 0.1 | 0.1 | 0.1 | 0.2 | 0.2 |

The rubber compositions of Examples 1-6 and Comparative Example 1 were mixed according to the following method:

The internal mixer was set to a temperature of 70° C. and a rotor speed of 40 rpm. The rubber matrix was added, prepressed, and mixed for 90 seconds. Magnesium oxide, stearic acid, anti-aging agent RD, 5 and polyethylene glycol PEG4000 were then added and mixed for 1 minute. Carbon black and paraffin oil were then added and mixed for 2 minutes. Finally, the remaining components were added and mixed for 2 minutes, and then a rubber mix was discharged. The rubber mix was plasticated on an open mill to a sheet, unloaded, and stood for 24 hours.

The sheet was remixed and discharged. The samples used in the Tensile and DIN wear tests were prepared according to the test standards and tested after stood for 20 hours.

The performance test results of Examples 1-6 and Comparative Example 1 were shown in Table 2:

| Test items | Comparative Example | Example 1 | Example 2 | Example 3 | Example 4 | Example 5 | Example 6 |
|---|---|---|---|---|---|---|---|
| Hardness (Shore A) | 52 | 51 | 53 | 55 | 56 | 58 | 59 |
| Tensile strength/MPa | 12.1 | 12.4 | 14.2 | 16.7 | 17.5 | 18.4 | 18.6 |
| Elongation at break/% | 428 | 445 | 462 | 478 | 469 | 442 | 431 |
| Relative wear volume as per DIN/mm$^3$ | 281 | 263 | 237 | 188 | 172 | 145 | 138 |
| After aging (150° C. × 70 h) | | | | | | | |
| Hardness (Shore A) | 53 | 52 | 54 | 56 | 57 | 58 | 59 |
| Retention rate of tensile strength/% | 76 | 79 | 82 | 84 | 84 | 85 | 86 |
| Retention rate of elongation at break/% | 63 | 68 | 70 | 75 | 72 | 76 | 78 |

Through comparison, it may be found that the mechanical properties, heat aging resistance and wear resistance of the rubber composition were improved after being used in combination with the highly branched polyethylene and/or the halogenated highly branched polyethylene.

Examples 7-13 and Comparative Example 2

The present invention provides a rubber composition with a good heat resistance and air tightness, which is suitable for the applications such as a tire inner-liner or an inner tube that have requirements for the air tightness. Examples 7-13 and Comparative Example 2 are used as examples. The basic compositions of Examples 7-13 and Comparative Example 2 are shown in Table 3:

The rubber compositions of Examples 7-13 and Comparative Example 2 were mixed according to the following method:

The internal mixer was set to a temperature of 70° C. and a rotor speed of 40 rpm. The rubber matrix was added, prepressed, and mixed for 90 seconds. Magnesium oxide, stearic acid, SP-1068, and Escorez1102 were then added and mixed for 1 minute. Carbon black, air-blocking agent (if any), and paraffin oil were then added and mixed for 2 minutes. Finally, the remaining components were added and mixed for 2 minutes, and then a rubber mix was discharged. The rubber mix was plasticated on an open mill to a sheet, unloaded, and stood for 24 hours.

The sheet was remixed and discharged. The samples used in the Tensile and air tightness tests were prepared according to the test standards and tested after stood for 20 hours.

The performance test results of Examples 7-13 and Comparative Example 2 were shown in Table 4:

TABLE 3

| Component | Comparative Example 2 | Example 7 | Example 8 | Example 9 | Example 10 | Example 11 | Example 12 | Example 13 |
|---|---|---|---|---|---|---|---|---|
| Halogenated butyl rubber No. | BIIR-1 | BIIR-1 | BIIR-1 | BIIR-1 | BIIR-1 | BIIR-1 | BIIR-1 | BIIR-1 |
| Amount of Halogenated butyl rubber | 100 | 95 | 90 | 85 | 75 | 70 | 60 | 50 |
| P2 No. | | P2-9 | P2-14 | P2-15 | P2-15 | P2-17 | P2-17 | P2-17 |
| Amount of P2 | | 5 | 10 | 15 | 25 | 30 | 40 | 50 |
| Zinc oxide | 3 | 3 | 3 | 3 | 3 | 3 | 3 | 3 |
| Magnesium oxide | 1 | 1 | 1 | 1 | 2 | 2 | 3 | 3 |
| Stearic acid | 1 | 1 | 1 | 1 | 1 | 1 | 1 | 1 |
| SP-1068 | 3 | 3 | 3 | 3 | 3 | 3 | 3 | 3 |
| Escorez 1102 | 5 | 5 | 5 | 5 | 5 | 5 | 5 | 5 |
| Carbon black N660 | 60 | 60 | 60 | 60 | 60 | 60 | 60 | 60 |
| Paraffin oil Sunpar2280 | 8 | 8 | 8 | 8 | 8 | 8 | 8 | 8 |
| Sulfur | 0.5 | 0.5 | 0.5 | 0.4 | 0.4 | 0.35 | 0.3 | 0.3 |
| Accelerator DM | 1.5 | 1.4 | 1.4 | 1.2 | 1.2 | 1.2 | 1 | 1 |
| DCP | | 0.2 | 0.4 | 0.8 | 1 | 1.2 | 1.4 | 1.6 |
| TAIC | | 0.1 | 0.2 | 0.5 | 0.5 | 0.6 | 0.7 | 0.8 |
| Air-blocking agent NM360 | | | | | | | 20 | 20 |

TABLE 4

| Performance test | Comparative Example 2 | Example 7 | Example 8 | Example 9 | Example 10 | Example 11 | Example 12 | Example 13 |
|---|---|---|---|---|---|---|---|---|
| Tensile strength/MPa | 10.7 | 11.1 | 11.7 | 12 | 12.8 | 13.3 | 14.8 | 15.3 |
| Elongation at break/% | 810 | 753 | 720 | 683 | 661 | 652 | 624 | 618 |
| Air permeability coefficient/$10^{-17}$ m$^{-2}$ (s · Pa)$^{-1}$ (25° C., nitrogen) | 0.25 | 0.25 | 0.26 | 0.26 | 0.27 | 0.27 | 0.23 | 0.24 |
| After aging (125° C. × 72 h) Retention rate of tensile strength/% | 84 | 84 | 87 | 88 | 89 | 89 | 91 | 91 |
| Retention rate of elongation at break/% | 71 | 73 | 75 | 76 | 78 | 80 | 78 | 81 |

Through comparison, it may be found that the rubber composition of the present invention may have an air permeability equivalent to that of the perhalogenated butyl rubber, but the mechanical strength and heat resistance are significantly improved, making it possible to have a better tolerance to the working conditions of high-temperature carcasses.

Although preferred embodiments of the present invention have been described herein, these embodiments are provided merely by way of examples. It is to be understood that variations of the embodiments of the present invention described herein can also be used in the practice of the present invention. It will be appreciated by those skilled in the art that various modifications, changes and substitutions can be made without departing from the scope of the present invention. It is to be understood that the scope of the present invention is defined by the appended claims, and the methods, structures, and equivalents thereof within the scope of the claims are also contemplated in the scope of the claims.

What is claimed is:

1. A rubber composition, comprising a rubber matrix and compounding components, wherein, in parts by weight, every 100 parts of said rubber matrix comprise 50-99 parts of a halogenated butyl rubber, 0-50 parts of a highly branched polyethylene P1, and 0-50 parts of P2 obtained by the polarization modification of said highly branched polyethylene P1, and the sum of P1 and P2 in parts by weight is 1-50 parts; and said compounding components comprise a vulcanization system.

2. The rubber composition according to claim 1, wherein, the branching degree of said P1 is 60-130 branches/1000 carbon atoms.

3. The rubber composition according to claim 2, wherein the branching degree of the P1 is 72-112 branches/1000 carbon atoms.

4. The rubber composition according to claim 1, wherein, the polar monomer used for preparing said P2 comprises at least one of maleic anhydride (MAH), methacrylic acid (MA), acrylic acid (AA), itaconic acid (IA), fumaric acid (FA), isocyanate, glycidyl methacrylate (GMA), methyl methacrylate (MMA), dibutyl fumarate (DBF), β-hydroxyethyl methacrylate (HEMA), dibutyl maleate (DBM), diethyl maleate (DEM), elemental halogen, a halogen-containing compound, a sulfur-containing compound, vinyltrimethoxysilane (VTMS), vinyltriethoxysilane (VTES), 3-methacryloxypropyltrimethoxysilane (VMMS), styrene (St), α-methylstyrene (α-MSt), and acrylonitrile (AN).

5. The rubber composition according to claim 4, wherein, said P2 is a halogen-containing branched polyethylene with a polar group which comprises at least one of a chlorine group, a bromine group, a chlorosulfonyl group, and a bromosulfonyl group.

6. The rubber composition according to claim 5, wherein, the mass percentage of halogen in said halogen-containing branched polyethylene is 0.2-50%, and said halogen-containing branched polyethylene comprises at least one of chlorinated branched polyethylene, brominated branched polyethylene, and chlorosulfonated branched polyethylene.

7. The rubber composition according to claim 6, wherein, the mass percentage of chlorine in said chlorinated branched polyethylene or said chlorosulfonated branched polyethylene is 0.5-45.5%, and the mass percentage of bromine in said brominated branched polyethylene is 0.8-4%.

8. The rubber composition according to claim 1, wherein, based on 100 parts by weight of said rubber matrix, said rubber composition further comprises up to 30 parts of an ethylene propylene diene monomer rubber.

9. The rubber composition according to claim 1, wherein, said vulcanization system is selected from at least one of a peroxide vulcanization system, a sulfur vulcanization system, a thiourea vulcanization system, a metal oxide vulcanization system, and a radiation vulcanization sensitization system.

10. The rubber composition according to claim 9, wherein, said vulcanization system is a peroxide vulcanization system, and based on 100 weight parts of said rubber matrix, the usage amount of peroxides is 1-10 weight parts, and a peroxide crosslinking agent is at least one of di-tert-butyl peroxide, dicumyl peroxide, tert-butyl cumyl peroxide, 1,1-di(tert-butylperoxy)-3,3,5-trimethylcyclohexane, 2,5-dimethyl-2,5-di(tert-butylperoxy)hexane, 2,5-dimethyl-2,5-di(tert-butylperoxy)-3-hexyne, bis(tert-butylperoxyisopropyl) benzene, 2,5-dimethyl-2,5-bis(benzoylperoxy)hexane, tert-butyl peroxybenzoate, and tert-butylperoxy-2-ethylhexyl carbonate.

11. The rubber composition according to claim 10, wherein, said peroxide vulcanization system further comprises 0.2-20 parts by weight of an auxiliary crosslinking agent, and said auxiliary crosslinking agent comprises at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene) acetone, 1,2-polybutadiene, an unsaturated carboxylic acid metal salt, and sulfur.

12. The rubber composition according to claim 1, wherein, based on 100 parts by weight of said rubber matrix, said compounding components further comprise 10-200 parts of a reinforcing filler, 0-80 parts of a plasticizer, 3-30 parts of a metal oxide, 0-3 parts of stearic acid, 0-15 parts of a surface modifier, 0-6 parts of a stabilizer, 0-15 parts of a tackifier, 0-20 parts of an adhesive, 0-150 parts of a flame-retardant agent, 0-20 parts of a foaming agent, and 0-40 parts of an air-blocking agent.

13. A conveyor belt, comprising a covering rubber layer for working surface, a covering rubber layer for non-working surface, and a tensile layer provided between said covering rubber layer for working surface and said covering rubber layer for non-working surface, wherein, the rubber used for at least one of said covering rubber layer for working surface and said covering rubber layer for non-working surface comprises said rubber composition according to claim 1.

14. A tire, comprising an inner liner, wherein, the rubber used in said inner liner comprises said rubber composition according to claim 1.

* * * * *